United States Patent [19]
Devanbu

[11] Patent Number: 5,826,256
[45] Date of Patent: Oct. 20, 1998

[54] APPARATUS AND METHODS FOR SOURCE CODE DISCOVERY

[75] Inventor: Premkumar Devanbu, N. Plainfield, N.J.

[73] Assignee: Lucent Technologies Inc., Murray Hill, N.J.

[21] Appl. No.: 781,564

[22] Filed: Oct. 22, 1991

[51] Int. Cl.[6] ......................................... G06F 9/00
[52] U.S. Cl. ........................... 707/4; 707/2; 707/3
[58] Field of Search ........................ 395/800, 500, 395/700, 650; 707/3, 4, 2

[56] References Cited

U.S. PATENT DOCUMENTS

| | | | |
|---|---|---|---|
| 4,667,290 | 5/1987 | Goss et al. | |
| 5,146,583 | 9/1992 | Matsunaka | 395/500 |
| 5,175,856 | 12/1992 | Van Dyke | 395/800 |
| 5,276,881 | 1/1994 | Chan | 395/700 |

OTHER PUBLICATIONS

Rich and Wills, "Recognizing a Program's Design: A Graph–Persing Approach", Jan. 1990, pp. 82–89 IEEE Software.

K. Redish, W. F. Smyth "Program Style Analysis: A Natural By–Produce of Program Compilation" Communications of the ACM, vol. 29, No. 2, Feb. 1986, New York, NY.

T. J. Biggerstaff "Design Recovery for Maintenance and Reuse", Computer, vol. 22, No. 7, Jul. 1989, Los Alamitos, CA.

Y.–F. Chen, et al., "The C Information Abstraction System", reprinted from IEEE Transactions on Software Engineering, vol. 16, No. 3, Mar. 1990.

Proc. of Tenth Int'l. Computer Software and Applications Conf. (COMPSAC), Chicago, Oct. 1986.

J. Steffen, "Interactive Examination of a C Program with Cscope", Proc. of the USENIX Association, Winter Conf., Jan. 1985.

*Primary Examiner*—Thomas G. Black
*Assistant Examiner*—Jean R. Homere
*Attorney, Agent, or Firm*—Gordon E. Nelson

[57] ABSTRACT

Apparatus for discovering information about the source code of a computer program. The apparatus includes a translator for translating a parse tree produced for the program's language in a specific programming environment into an independent parse tree and an analyzer for analyzing the independent parse tree to discover the information. The translator is generated by a translator generator from a specification for the language and the programming environment and the analyzer is generated by an analyzer generator from a specification of the information to be discovered. The specification of the information to be discovered may specify only methods of analysis which can be completed in polynomial time. Methods of using the apparatus are also disclosed.

13 Claims, 6 Drawing Sheets

```
0  GLOBAL FILEOUT ''/tmp/globlist''

1  PROC GlobalFind

2  ROOTNODETYPE File;
3  LOCAL GlobList;
4  LOCAL TheFuncName;
5  LOCAL TheLineNo;
6  {
7  (file
8    <globals-
9       (assign GlobList $ThisNode) >
10   <functions-
11     {function
12       <funcname- (assign TheFuncName $ThisNode)>
13       <stmtlist-
14         {stmt
15           <linenumber- (assign TheLineNo $ThisNode)>
16           [assignment
17             <lhs-
18               (variable?
19                 (COND
20                   ((MEMBER $ThisNode GlobList)
21                     (PRINT
22                       FILEOUT
23                         ''Function %s modifies variable %s on line %d''
24                         TheFuncName $ThisNode TheLineNo)) > ] } > ) } > )
25 }
```

```
0  Stmt: {
1      LineNo:   an Integer  < "(((CN *) GvalG )->CValue.LinenoOffset" >
2      Filename: a String    < "(((CN *) GvalG) ->CValue.LinenoFname" >
3  }
```

```
0  Stmt: [
1      Exit
2      Freturn
3      Goto
4      Continue
5      CompoundStmt
6      Switch
7      Whileloop
8      If
9      Forloop
10     Doloop
11     ExprStmt
12 ]
```

```
0  CompoundStmt : "(((CN *) GvalG)->CnWhat == NtBlock" {
1
2      LocalVars:  SetOf Variable
3                  < "( (CN) GvalG)->NtVar" ,
4                    "( (ID) GvalG) ->NextVar" ,
5                  >
6      StmtList:   ListOf Statement
7                  < "(FirstStmt ((CN) GvalG))" ,
8                    "( (CN) GvalG)->NextStmt" ,
9                  >
10 }
```

Expressions

```
constant    ::= $ThisNode | $Frontier
expr        ::= Variable | Constant
             |  (cons expr expr)
             |  (append expr expr)
             |  (length expr)
             |  (eq expr expr)
             |  (equal expr expr)
             |  (member-eq expr expr)
             |  (member-equal expr expr)
             |  (null expr)
Conditional ::=
```

Statements

```
stmt     ::= assign | print | eval | call | condstmt
assign   ::= (assign variable expr)
print    ::= (print variable string expr*)
call     ::= (call tag expr*)
eval     ::= (eval string)
condstmt ::= (cond onecond*)
onecond  ::= ( (conditional)    traversal* )
```

FIG. 7C

| FIG. 7A | FIG. 7B |

FIG. 7B

Traversals

| | | |
|---|---|---|
| traversal | ::= | stmt \| child \| slot \| test \| listmembers \| subtree \| fulltree |
| child | ::= | (typetag traversal*) |
| slot | ::= | (slotname traversal*) |
| test | ::= | (typetag? traversal*) |
| listmembers | ::= | {typetag[?] traversal* } |
| subtree | ::= | [ traversal* ] |
| fulltree | ::= | [ $ROOT traversal* ] |

Declarations

| | | |
|---|---|---|
| declarations | ::= | vardecl \| procdecl |
| vardecl | ::= | globaldecl \| argdecl \| localdecl |
| globdecl | ::= | globalvardecl \| globalfiledecl |
| globalvardecl | ::= | (newline) global varspec |
| globalfiledecl | ::= | (newline) file tag string ; |
| localvardecl | ::= | (newline) local varspec |
| argdecl | ::= | (newline) local varspec |
| varspec | ::= | vartype tag ; |
| vartype | ::= | node \| float \| string \| int |
| procdecl | ::= | (newline) PROC tag (newline) rootnodetype typetag [argdecl \| localvardel ]* (newline) { traversal* } |

Complete Query

| | | |
|---|---|---|
| g-query | ::= | globalfiledecl* globalvardecl* procdecl* |

APPARATUS AND METHODS FOR SOURCE CODE DISCOVERY

1 BACKGROUND OF THE INVENTION

1.1 Field of the Invention

The invention relates to software development generally and relates particularly to the problem of analyzing existing source code.

1.2 Description of the Prior Art

The growing cost of software development, particularly in larger systems, is well documented. A significant portion of this cost is due to the time programmers spend on maintenance. Programmers are constantly trying to comprehend large, unfamiliar pieces of code. This comprehension task has been called discovery.

There are several tools that are currently available to assist programmers during discovery. These tools run over source automatically, producing reports. Examples of such systems are CSCOPE and CIA. CSCOPE is explained in detail in J. L. Steffen, "Interactive examination of a c program with Cscope", *Proceedings of the USENIX Association, Winter Conference*, Jan., 1985, and CIA is explained in detail in Chen, Y. F., and Ramamoorthy, C. V., "The C Information Abstractor", *Proceedings of the Tenth International Computer Software and Applications Conference* (COMPSAC), Chicago, October 1986. While currently-available discovery tools are useful, they are limited. For example, one cannot use them to answer questions such as the ones presented below:

1. Do any of the routines that call CollectDigit directly modify the global variable CallStatus (i.e., without following pointers. Some of these questions, particularly those where pointers might be involved, cannot be answered purely by static analysis; however, quite often, this is not of concern—direct accesses to variables, structures, etc., without going through pointers, would themselves be useful to find.) .
2. Where is the value of the LampStatus field of the StationRec structure being modified directly?
3. Do all routines that switch on a variable of enumeration type TrunkType handle the ISBNtariffB case?
4. Is somebody putting a pointer to a CallRec data structure directly into a UserRec data structure?
5. Do any routines that call the SendMsg routine, directly pass an argument of type "pointer to a structure of type MsgBuf"?
6. Which routines call only the routine SendMsg?
7. Is a pointer to a struct of type MsgBuf ever typecast to a pointer to a struct of type GenData?
8. Check that no subroutine redeclares a variable in a contained context with the same name as a parameter or a global variable.

Furthermore, they are restricted to programs written in a single source language. In the case of CSCOPE and CIA, the one source language is C. What is needed, and what it is an object of the apparatus and methods disclosed herein to provide, is discovery tools that can answer questions like those enumerated above for programs written in many different programming languages.

2 SUMMARY OF THE INVENTION

The foregoing object is attained by providing a discovery tool for discovering information about the source code of a program by analyzing a parse tree representing the source code. The discovery tool is characterized by the following:

a translator for translating a first parse tree representing the source code into a second parse tree representing the source code, the first parse tree being dependent either on the source code's language or on the environment in which executable code is produced from the source code or on both and the second parse tree being independent of both the language and the environment; and means for discovering the information about the source code by analyzing the second parse tree.

The foregoing object may also be attained by employing the following method for analyzing a specific aspect of a computer program written in a given language in a given environment. The steps of the method include:

receiving a dependent parse tree for the program which is dependent on either the given language or the given environment or on both;

translating the dependent parse tree into an independent parse tree which is neither environment- nor language-dependent; and analyzing the independent parse tree as required to obtain information about the specific aspect.

It is thus an object of the invention to provide improved programming tools and techniques;

It is another object of the invention to provide programming tools and techniques which are implementation-independent; and It is a further object of the invention to provide programming tools and techniques which permit the user to specify the kind of analysis to be performed.

These and other objects and advantages of the invention will be apparent to those of ordinary skill in the art upon perusal of the following Drawing and Detailed Description.

3 BRIEF DESCRIPTION OF THE DRAWING

Reference numbers in the Drawing have two parts: the two least-significant digits are the number of an item in a figure; the remaining digits are the number of the figure in which the item first appears. Thus, an item with the reference number 201 first appears in FIG. 2.

4 DETAILED DESCRIPTION OF A PREFERRED EMBODIMENT

4.1 Introduction

Computer programming is increasingly done in programming environments. In such a programming environment, a programmer writes the source code for the program in a high-level language such as C or ADA and then uses a computer program called a compiler to produce object code which is executable by a computer. Modern compilers have two main components: a front end, which analyzes the source code and produces an annotated parse tree representing the source code, and a back end which uses the annotated parse tree to generate the object code. Once generated by the front end, the annotated parse tree can also be used by other programming tools belonging to the environment, such as debuggers or discovery tools.

As may be seen from the foregoing, programming environments tend to be language- and compiler-specific. A debugger or discovery tool built for one programming environment will work only with the annotated parse tree provided by that programming environment's compiler; using the debugger or discovery tool in another programming environment requires a substantial reimplementation of the tool so that it will work with the new environment's annotated parse tree. Further, the fact that programming environments are language-and compiler-specific has resulted in discovery tools which are pre-programmed to answer only certain kinds of questions about the source code, rather than discovery tools which can be programmed to ask any question about the source code which the programmer finds useful. Again, the problem is the language- and environment-dependent annotated parse tree. To successfully program a discovery tool which uses such an annotated parse tree, the programmer must understand the annotated parse tree. Since such language- and environment-dependent annotated parse trees are not only different for each language-environment combination, but are also often highly idiosyncratic, programming the tools has generally been too difficult to make programmability worth while.

The result of the dependence of programming environments on language- and environment-dependent annotated parse trees has in short been a substantial reduction in the usefulness of such environments to the programmer. The fact that such environments must be created anew for each language-compiler combination has reduced their richness, and the fact that each new language-compiler combination means a new environment for the programmer has increased the time and effort required before a programmer can successfully work in the new environment.

Figure 1:
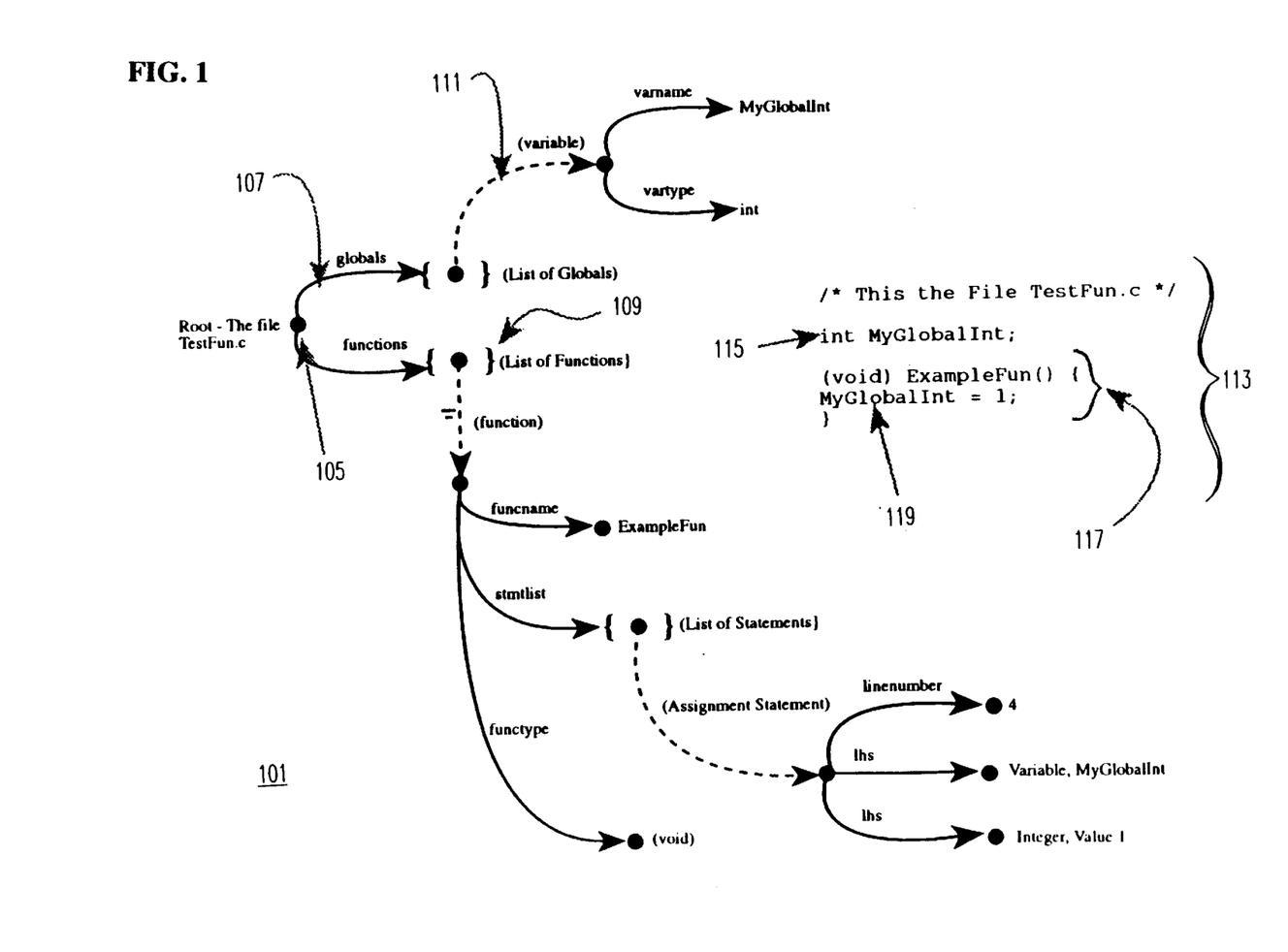
FIG. 1 is an example independent parse tree.

4.2 The Independent Parse Tree: FIG. 1

As sketched in the Introduction, a fully-programmable discovery tool requires a fully attributed parse tree representing the source code. Given the parse tree, the analyzer can walk over the parse tree and extract the information desired. The discovery tool disclosed herein avoids the problems associated with language- and compiler-dependent parse trees by employing an independent parse tree to represent the source code. The independent parse tree is so termed herein because it is the same for all language-compiler pairs for which the discovery tool disclosed herein has been implemented. The manner in which the independent parse tree is derived from the dependent parse tree produced by a given front end will be described in more detail below.

FIG. 1 shows one of the independent parse trees used by the discovery tools disclosed herein. Independent parse tree 101 represents the code in the source file TEST.FUN.C, which is shown at 113. The code consists of a comment (enclosed in the characters /* and */), a declaration 115, which declares a global integer variable MyGlobalInt, a function definition 117, which defines the function exampleFun, and as part of function definition 117, an assignment statement 119, which assigns the value 1 to MyGlobalInt.

Independent parse tree 101 is made up of nodes. In FIG. 1, nodes appear as bullets. There are two kinds of nodes: simple nodes 105, indicated by the bullets alone, and list nodes 109, indicated by bullets enclosed in curly braces ({ }). A list node 109 indicates a set of simple nodes 105. A simple node may have one or more children, indicated in FIG. 1 by solid arrows 107. A child node may be either a simple node or a list node. The dotted arrow 111 indicates that the node at the end of the arrow is one of the simple nodes 105 in a list node 109.

Each node in independent parse tree 101 has a type. The type of a simple node 105 specifies the entity in the source code represented by the node and also specifies the number and kinds of children the node may have. In the following, a simple node 105 is referred to as having slots. Each slot may be filled by a child node of the proper type. The type of a list node 109 specifies the type of the simple nodes 105 represented by list node 109. All of the simple nodes 105 represented by list node 109 must have the same type.

Beginning with the leftmost node 105 in independent parse tree 101, that node is the root node. It represents the file Test.fun.c which contains program 113. Nodes of the root type include slots for a list node 109 containing simple nodes 105 representing global variables (variables which are accessible from anywhere in a program) and a list node 109 containing simple nodes representing the functions making up the program. The example program contains a single global variable, so the list node 109 labelled list of variables) contains a single simple node 105 which represents the variable MyGlobalInt That simple node 105 has two slots, one for a simple node 105 representing the variable's name, and one for a simple node 105 representing the variable's type.

Similarly, there is a single function, so the list node 109 labelled list of Functions contains a single simple node 105 which represents the function exampleFun. exampleFun's simple node 105 includes three slots: one for a simple node 105 representing the name of the function, one for a list node 109 which is a list of nodes representing statements in the function, and one for a simple node 105 which indicates the type of the value returned by the function. Since exampleFun contains a single statement 119, the list node 109 contains a single simple node 105 representing an assignment statement. That node in turn has three slots: one representing the line number of the statement in the program, one representing the variable to which the assignment statement assigns a value (in this case, the global variable MyGlobalInt), and one representing the value being assigned, in this case, the constant 1.

As can be seen from FIG. 1, questions concerning example program 113 can be answered using independent parse tree 101. For example, a question concerning locations in program 113 at which values are assigned to MyGlobalInt can be answered by examining each node in the list node 109 containing the list of function nodes representing functions in the program to determine whether the list of statements which is one of the children of the function node contains a simple node 105 for a statement in which a value is assigned to MyGlobalInt. If it does, the children of simple node 105 contains the statement's line number in the program and the source of the value being assigned.

In principle, any tool that be used to build a parser can be used to construct independent parse tree 101. Examples of such tools are the UNIX tools Lex and Yacc. More examples of such tools include the Pan system, described in Ballance, R., Graham, S., and Van De Vanter, M., The Pan Language-Based Editing System For Integrated Development Environments, *Proceedings, 4th SIGSOFT Symposium on Software Development Environments*, Irvine, Calif. 1990, CENTAUR, described in Borras, P., Clement, D., Despeyroux Th., Incerpi, J., Kahn, G., Lang, B., Pasual, V., CENTAUR: *The System, Proceedings of the SIGSOFT/SIGPLAN Software Engineering Symposium on Practical Software*

*Development Environments,* 1988, Boston, Mass, Gandalf, described in Habermann, N., and Notkin, D., Gandalf: Software Development Environments, *IEEE Transactions on Software Engineering,* SE-12, December 1986, REFINE, described in Refine Users Manual, The Reasoning Systems Corporation, Palo, Alto, Calif. and the Cornell Synthesizer Generator, described in Reps, T., and Teitelbaum, T., The Synthesizer Generator, *Proceedings of the SIGSOFT/SIGPLAN Symposium on Practical Software Development Environments,* 1984, Pittsburgh, Pa.

The problem with using these tools to build the independent parse tree is that in order to get independent parse tree 101 for a given language, it would be necessary to completely implement a fully-functioning front end. This is quite difficult, even for relatively simple languages like ANSI C. For more complex, irregular languages like C++ or ADA, the task is formidable. As will be explained in more detail later, a preferred embodiment of the apparatus disclosed herein employs a translator to produce independent parse tree 101 from the language- and environment-dependent parse tree produced by a given front end. Thus, the preferred embodiment eliminates the need to re-implement an entire front end to obtain independent parse tree 101.

4.3 Architecture of the Discovery Tool

Figure 3:
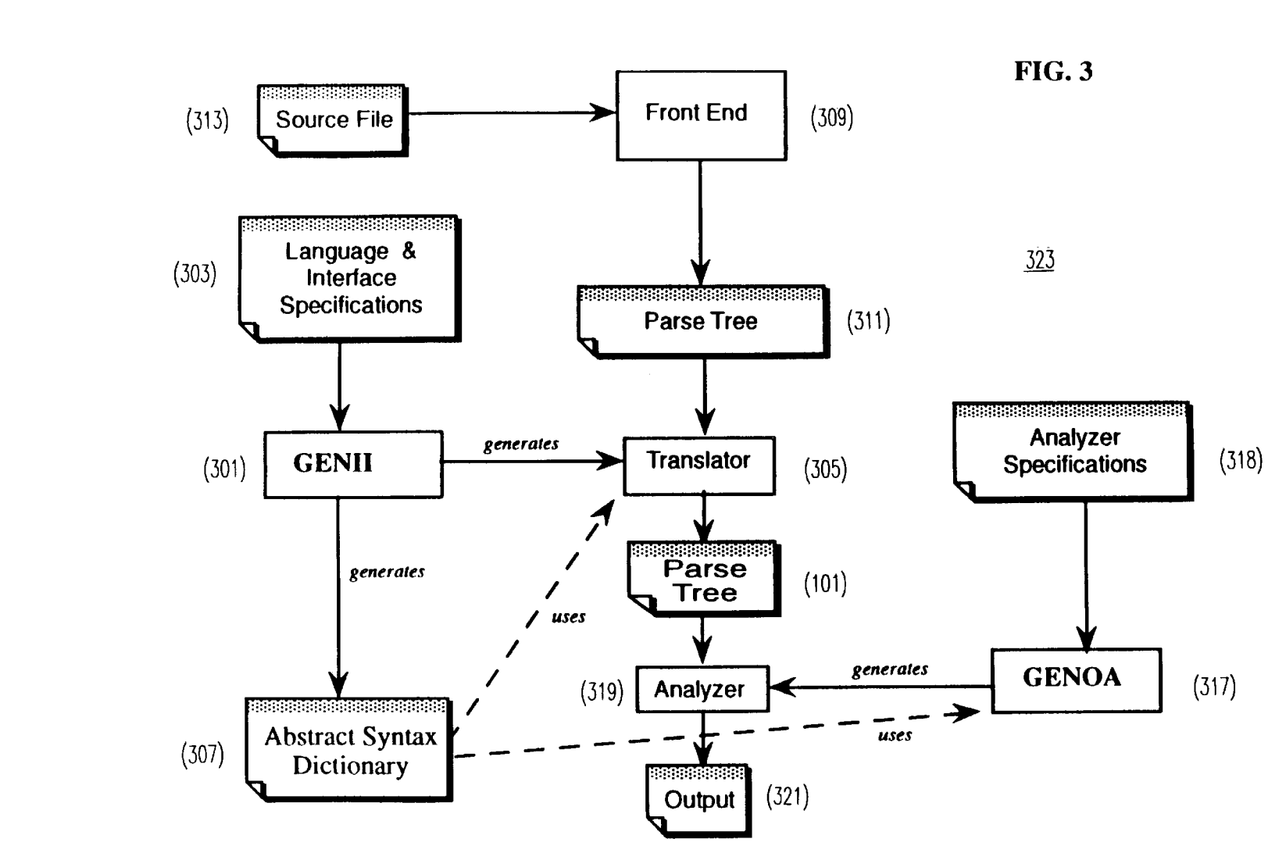
FIG. 3 is a block diagram of the discovery tool.

FIG. 3 is an overview of the architecture of the discovery tool disclosed herein. FIG. 3 is a conceptual block diagram of discovery tool 323. In the diagram, the shaded boxes denote data items, and the unshaded boxes represent "processing" elements. Beginning at the top, a source code file 313 is provided to front end 309 of an existing environment. The result is language- and environment-dependent parse tree 311. Language- and environment-dependent parse tree 311 must now be translated into independent parse tree 101. This is done by translator 305, which takes parse tree 311 provided by front end 309 and produces independent parse tree 101. In a preferred embodiment, translator 305 is produced by a component of the discovery tool called GENII 301. GENII 301 is a program which takes a specification 303 of the high-level programming language the program is written in and of front end 309 and parse tree 311 which it produces and uses this information to produce translator 305. While some effort is required to produce specification 303, that effort is far less than the effort needed to produce an entire front end 309 and need only be put forth once for a given programming language-environment combination. Once specification 303 has been made, GENII 301 generates translator 305, and translator 305 can then be used to produce independent parse tree 101 from parse tree 311. In addition to generating translator 305, GENII (301) generates abstract syntax dictionary (307). Abstract syntax dictionary 307 contains information about the language of the source file. The information is used by translator 305 in producing independent parse tree 101.

Source code analyzers for finding answers to specific questions are produced as follows: An analyzer specification 318 which specifies how the source code is to be analyzed is written in a language which will be described below. The specification 318 is provided to a component of the discovery tool termed GENOA, which generates an analyzer program 319. In generating analyzer program 319, GENOA employs abstract syntax dictionary 307 to determine whether the kind of analysis specified in specification 318 makes sense for the language of source file 313. Analyzer program 319 is then run on independent parse tree 101 to produce output 321, which contains the answer to the question specified in specification 318.

4.3.1 Language and Interface Specification 302

In the following section, we describe how the interface to a given existing front end 309 is specified and how a translator 305 is generated therefrom.

Discovery tool 323 is interfaced to a specific front end for a target language by writing a specification 303 in the GENII specification language, and running this through GENII applications generator 301; this creates a set of translation routines (305) that implement the attributed parse tree abstract data type layer, and an abstract syntax dictionary 307.

The GENII specification language is used to describe the abstract syntax structure of the target language, as well as the data structures used by the particular front end to implement dependent parse tree 311. To illustrate the GENII specification language, we show part of the specification that implements the interface between GENOA and the CIN C interpreter, that is, that describes how a dependent parse tree 311 produced by the CIN C interpreter is translated into an independent parse tree 101. CIN is a reflective C programming environment with facilities to create, execute, test, debug, and analyze C programs. Cin has an open architecture that allows it be incorporated into other tools. Details of Cin are given in "T. Kowalski, et al.," A Reflective C Programming Environment, /emProceedings of the INternational Workshop on UNIX-Based Software Development Environments, USENIX, Dallas, Tex., Jan. 16, 1991.

Figure 4:
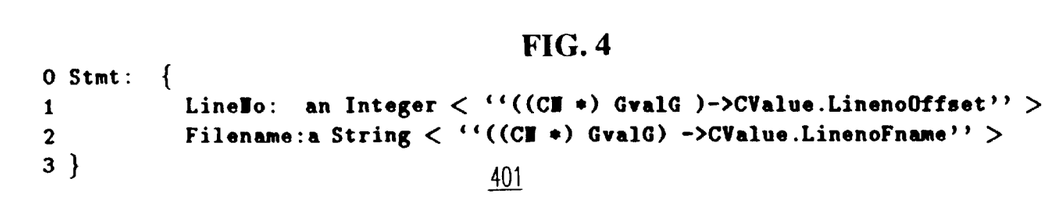
FIG. 4 is a declaration in the language and interface specification.
Figure 5:
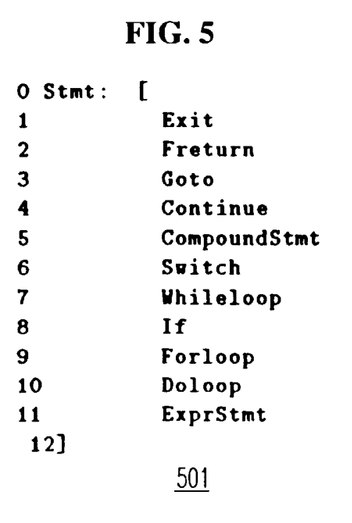
FIG. 5 is another declaration in the language and interface specification.

The full interface specification 303 for CIN is quite long; in this section, we show the part having to do with the different types of statements in C, and the details of the compound statement. The specification consists of a series of declarations of node types that constitute the abstract syntax of the language as the language is represented in independent parse trees 101. There are essentially three major kinds of node type declarations; a single node declaration, a node variants declaration, and a variant node type declaration. In FIG. 4, we show a single node type of declaration 401; here we define the children of a single node, and how these children can be generated from the parent single node (by invoking code in front end 309). FIG. 4 declares a node of type stmt, representing any C statement, to have two attributes—(line 1) LineNo, with a filler of type Integer, which represents the line number of the statement in a file containing a C program, and (line 2) FileName which is a String, which represents the file containing the statement. The fragments of C in the quotes indicate the code in front end 309 which must be invoked to get the line number of a statement from parse tree 311 produced by front end 309. The attributes defined for nodes of the type stmt are inherited by nodes having types corresponding to the different kinds of statements in C. FIG. 5 shows how the kinds of C statements are declared in language and interface specification 303. Declaration 501 is a node variants type of declaration.

Line 0 identifies the node type (here it is a stmt) for which the variants are being declared. Eleven different kinds of statements in C are displayed, from Exit (line 1) to ExprStmt (line 11) (which is an expression statement, like an assignment statement). We call each of these a variant node of type stmt. Nodes that have of any of these variant node types inherit all the attributes from stmt. Clearly, when front end 309 produces nodes in dependent parse tree 311 corresponding to these different kinds of C statements, we need to be able to identify the type of statement represented by that node, and translate that node into a node of the proper variant type in independent parse tree 101.

Figure 6:
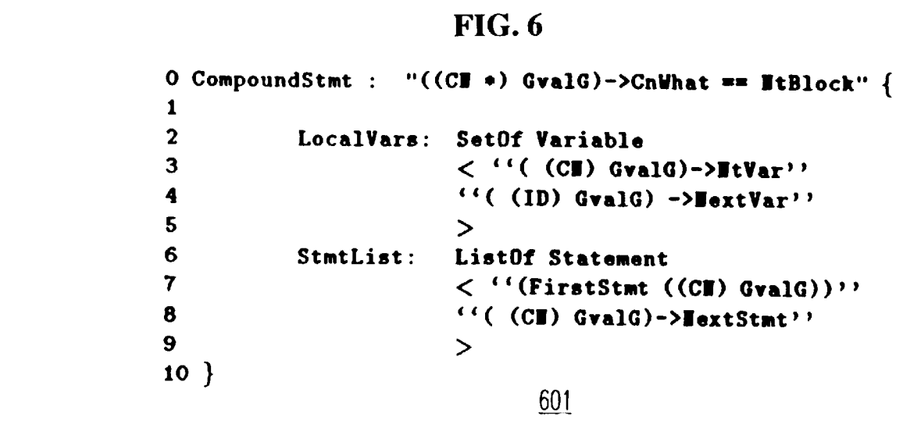
FIG. 6 is another declaration in the language and interface specification.

FIG. 6 shows a variant node declaration 601 for one of the statement types declared in declaration 601, namely, the compound statement type.

The code fragment in quotes (e.g., at the end of line 0) is the code in front end 309 that can be invoked to test if a node is a compound statement. If so, such a node has two children—LocalVars (lines 2–5) (a list of nodes, each of which is of type Variable), and StmtList, (lines 6–9 (a list of Statements). The code fragment on line 3 (respectively, 7) identifies the functions in front end 309 which get the first Variable (resp., Stmt) in the list of LocalVars (resp., Stmtlist); the fragment on line 4 (8) tells us how to get the next successive variable (resp., Stmt) in the list.

The full interface specification for the CIN front end to C has declarations of about 90 node types (both variant and simple); it is about 800 lines of code for GENII 303. The specification in this case expands to over 17,000 lines of interface code that build abstract syntax dictionary 307 for the attributed syntax tree in CIN, and implement the routines which translator 305 uses to translate the data structures of dependent parse tree 311 produced by CIN into independent parse tree 101.

GENII includes facilities to specify unparsing of nodes in independent parse tree 101—e.g.,one can specify how the actual syntax in the C language of a node of type CompoundStmt is to be derived from the constituents of the node in independent parse tree 101.

Figure 2:
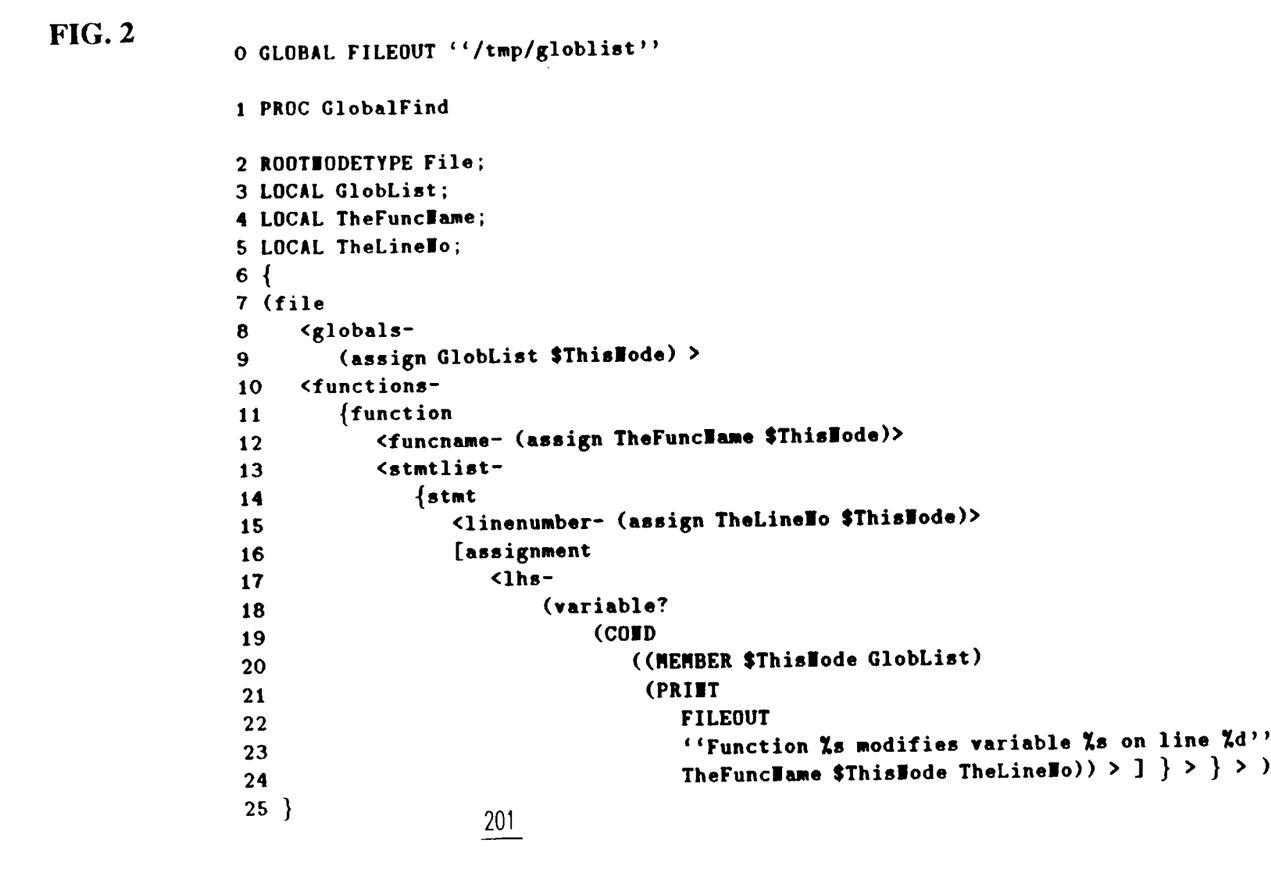
FIG. 2 is an example analyzer specification.

4.4 Defining an Analyzer 321: FIG. 2

Analyzer 319 does its analysis of the program in source file 313 by using the functions specified in the nodes of independent parse tree 101 to obtain the required information from the parse tree made by front end 309. GENOA 317 creates analyzer 319 by operating on independent parse tree 101 to obtain the functions required for analyzer 319. The main operations performed by GENOA 315 on a node in independent parse tree 101 are: a) Extract the filler(s) of a given slot for a given node (e.g., find the linen umber of a statement node) b) Expand a given node, i.e., find all its children c) TypeOf, find the type of a given node (e.g., is this Statement an If, or Switch, a Goto . . . ?).

When analyzer code 319 is executed, it invokes the code in front end 309 specified in analyzer code 319. As results are returned by the invocations, analyzer code 319 creates new nodes in independent parse tree 101 to store the results. The new nodes can in turn be expanded as the execution of analyzer code 319 proceeds.

FIG. 2 shows an example analyzer specification 319. Example analyzer specification 201 causes GENOA 317 to produce an analyzer 319 which can be executed on any C program compiled by front end 309 to do the following:

For each source file, print in the report file /tmp/globlist, all functions and linen umbers where global variables occur on the LHS of assignment statements.

There are existing tools in C language programming environments which detect where a global variable appears in a statement, but such tools are generally unable to determine where the variable is changed, that is, where a global variable syntactically occurs directly on the left-hand side of an assignment statement.

The language used to write analyzer specifications 318 (termed hereinafter the ("analyzer language") specifies actions on language-independent parse tree 101 and is consequently particularly adapted to describing such actions. The analyzer language specifies its actions in terms of types of nodes and in terms of operations on the contents of the slots of a node of a given type. One can also define procedures that can be called on a node. Recursion is also allowed.

As shown in FIG. 2, line 0 of analyzer specification 201 specifies an output file 321 (line 0) to receive the results of the execution of analyzer specification 201. Line 1 names the procedure, GlobalFind. Procedures in the analyzer language always have one implicit argument, the "current node". In this case, the "current node" is the rootnode of independent parse tree 101. That node has the type "file", as specified at line 2. The file represented by the "current node" is of course the file 313 which contains the source code of the program being analyzed. We then define a few local variables (lines 3–5).

Lines 6 to line 25 form the body of the procedure. The left curly brace at line 6 and its corresponding right curly brace at line 25 specify a list iteration operation which is to be performed on one or more slots of the node whose name appears following the left parenthesis at line 7; the right parenthesis at the end of line 24 indicates the end of these operations, which are to be performed on the node "file", which is the root node of independent parse tree 101.

Angle brackets are used to indicate slots upon which the iteration operation is to be performed. Thus, the first slot on which the list iteration operation is performed is the slot which contains a list of nodes representing global variables. In the description of the itneration operation, the node currently being operated on is indicated by the analyzer language-defined name $ThisNode. As may be seen from line 9, each node on the list is stored in variable GlobList, which thus contains a list of all of the global variables in the program at the end of the list iteration operation.

The next list operation is performed on the slot which contains a list of nodes representing functions. The operations on the nodes in this list are defined at lines 11–24. For each node in the list of function nodes, the analyzer does the following: first, it places the function name in the local variable TheFuncName. Then it performs another list iteration operation on each statement node in the list of statement nodes which is a child of each function node. In each statement node, the analyzer specification obtains the line number of the statement from the statement node's line number node child and assigns the line number to the local variable TheLineNo. Then, the program searches through the subtree of the statement node to determine whether the statement in question is an assignment statement with a variable on its left-hand side (lines 16–18). Searches through subtrees of nodes are indicated by left- and right angle brackets, seen here on lines 16 and 24 respectively. If the statement in question in an assignment statement, the list of global variables in GlobList is examined (line 20) to determine whether the variable on the left-hand side of the assignment statement represented by the statement node is on the list of global variables. If it is, a print statement (lines 21–24) is executed which outputs a message to the output file indicating the function and line number at which the global variable is modified.

Figure 7A:
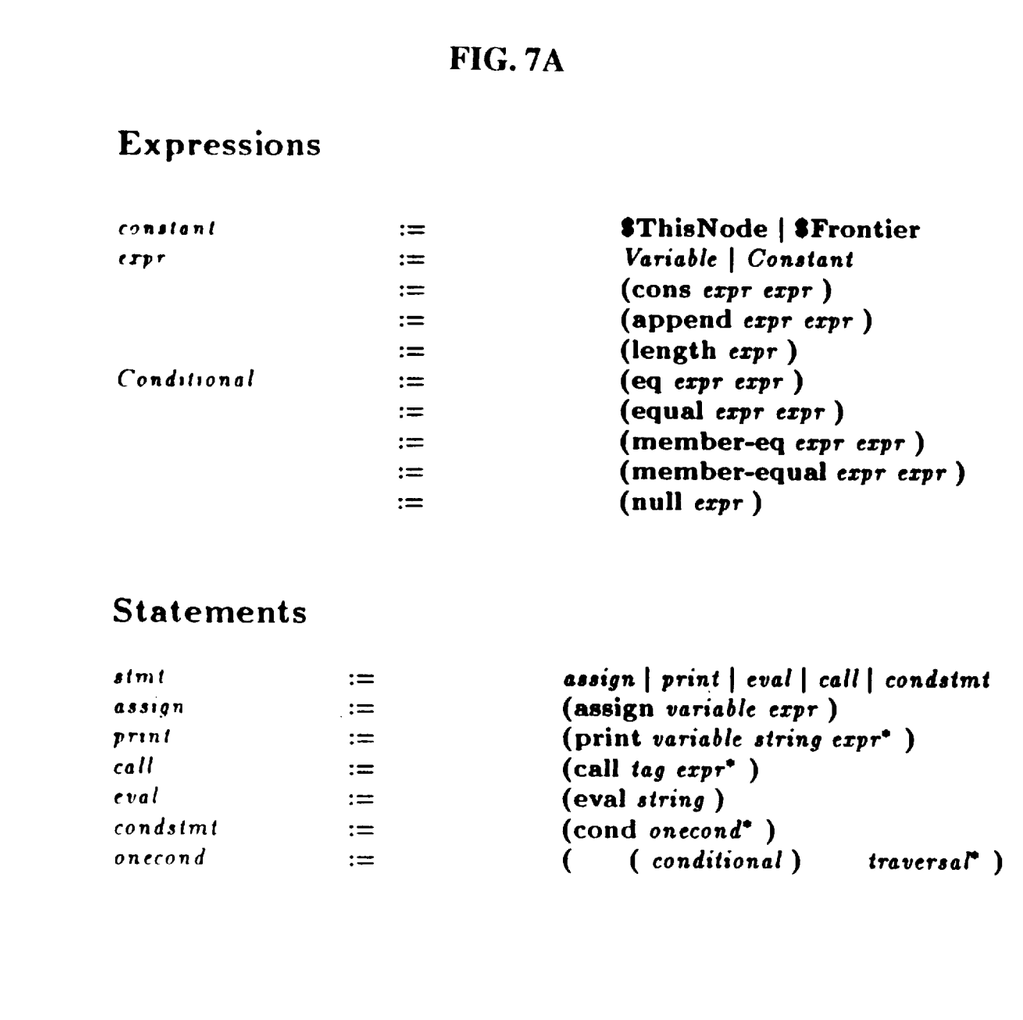
FIG. 7 shows the syntax of the language used to write analyzer specifications.
Figure 7B:
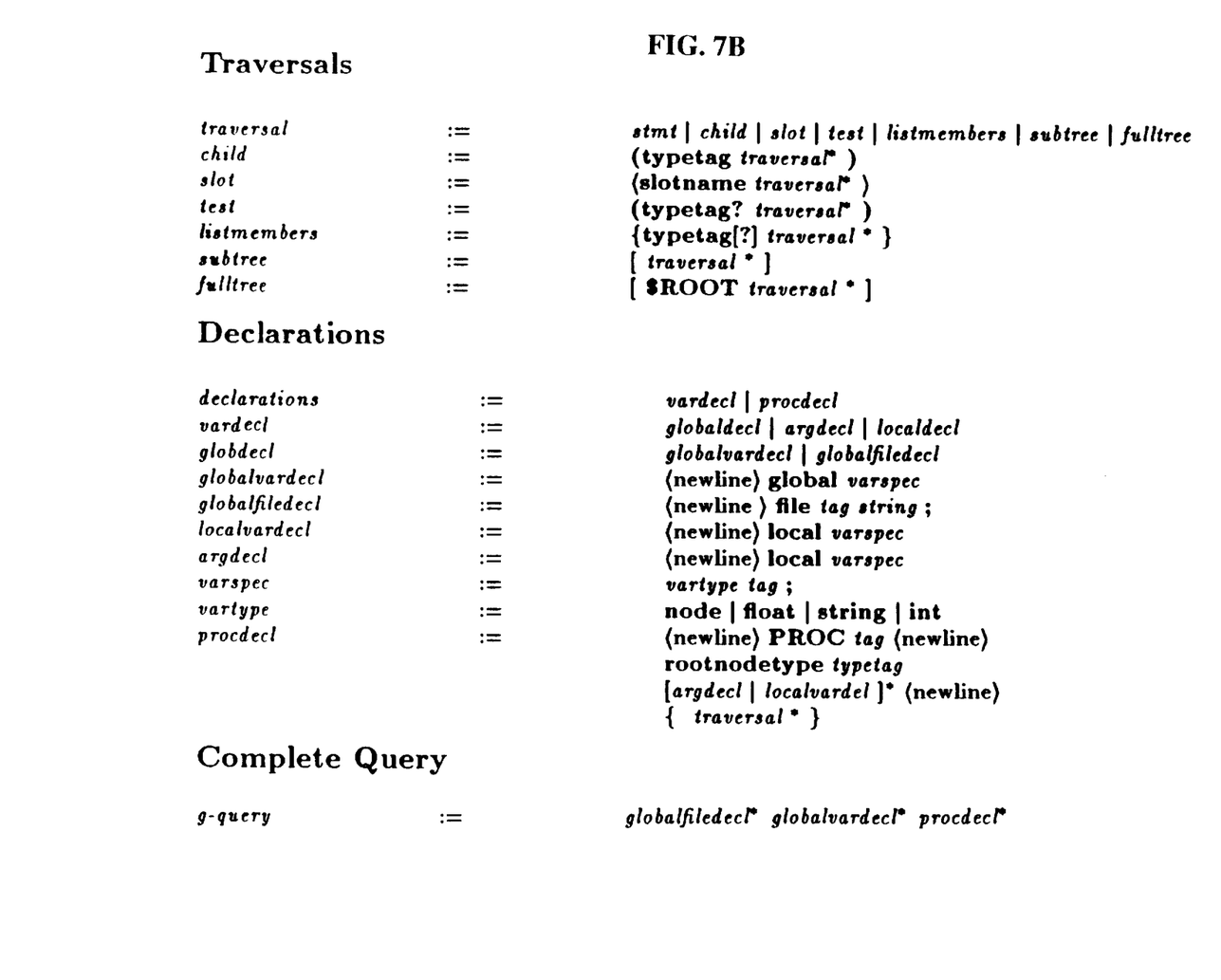
Figure 7C:
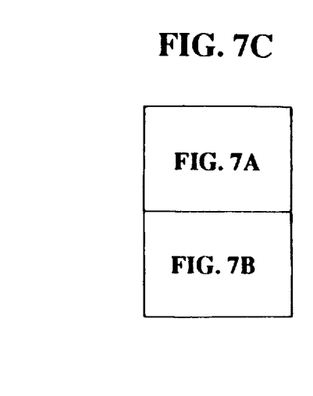

4.5 Syntax of GENOA and characterization of $Q_{genoa}$: FIG. 7

The syntax of analyzer language 701 is shown in FIG. 7. This language is specially designed to be able express compactly and conveniently, most kinds of analysis that programmers would wish to perform over large bodies of code. Moreover, there exists a subset of the analyzer language which is capable of expressing most practical kinds of code analysis (for example, the ones listed in the discussion of the prior art above) but which still has desirable computational properties. Such computational properties are required because Analyzers 319 generated by GENOA 317 are likely to be run over large bodies of code.

Computationally, there are two main categories of constructs in the analyzer language: expressions and traversals.

In the case of expressions, the operations listed in FIG. 7—append, equal, cons, member, etc., are all low order polynomial time. Cons of a single node to a list is O(1), as is equal with single nodes. Append of two lists is linear, as are equal and member. Considering traversals, taking a specific child of a node (say, the lhs of an assignment node) is a constant time operation; taking a child of a certain type could be linear in the number of subnodes of a given node. List traversals and subtree traversals are respectively linear in the size of the list, or of the subtree. The fulltree traversal iterates over the entire tree, starting with the root.

What class of queries can be specified in the full analyzer language? Clearly, using recursions, one can write a non-terminating computation; but most practical examples we came across, including the ones previously listed on can be handled without recursion, or for that matter, even procedure calls. Let us therefore omit recursion and procedure calls from consideration. Next, it is easy to see that with append, we can easily construct lists that are exponential in the size of a parse tree (simply embed an append expression inside a "[" traversal, doubling the length of a list each time through). Thus, it is possible write queries whose execution time can be exponential in the size of the parse tree. To eliminate this, we can restrict one argument of append and cons expressions to be elements of the tree, not a variable; this restriction does not affect our ability to write many practical queries. With this restriction, in the worst case, we can grow the lists at most n nodes (where n is the size of the parse tree) for each node we visit in the tree; we show below that one can only grow lists that are polynomial in the size of the parse tree.

With these limitations, we call the remaining analyzer language $Q_{genoa}$. This language has important practical properties:

Any query (or specification of analysis) over parse trees expressed in this language can be computed in polynomial time.

Conversely, the $Q_{genoa}$ language can express all polynomial time computations on parse trees.

5 Conclusion

In the foregoing, we have disclosed the GENOA/GENII system 323 for building arbitrary code analyzers for programs implemented in various programming languages. GENII 301 allows GENOA 317 to be interfaced to different language front ends, thus simplifying the task of implementing a customizable analyzer and have shown how one of ordinary skill in the art to which the invention pertains may make and use system 323. In addition, we showed that the analyzer language has some useful iteration constructs that are both expressive and easy to evaluate; in fact, there is a useful sublanguage of the analyzer language that can express precisely all the queries on parse trees.

The foregoing Detailed Description has shown how a system 323 may be made to perform an analysis on a program in the C language; however, as was made clear in the Detailed Description, the invention is in no way limited to discovery tools for the C language, but may be used to analyze source code written in any high-level language. Similarly, while a particularly useful embodiment of independent parse tree 101 has been disclosed, other embodiments are possible, and the other components of system 323 will vary to suit that embodiment of independent parse tree 101. Finally, various forms may be found for language and interface specification 303 and analyzer specification 319, including interfaces which employ graphic representations and in which the specification is made at least in part by manipulating graphic representations. Similarly, output 321 may be a graphic representation of source file 313, instead of a text file. Further, as indicated in the Detailed Description, languages having the properties of the sublanguage of the analyzer language may be used with any parse tree.

For the above reasons, the Detailed Description is to be understood as being in all respects illustrative and exemplary, but not restrictive, and the scope of the invention is not to be defined by the Detailed Description, but rather by the claims as interpreted in light of the doctrine of equivalents.

What is claimed is:

1. A method of discovering information useful to a programmer about a specific aspect of the source code of a computer program, the source code being written and compiled in one of a plurality of language-environment combinations and the method comprising the steps of:

receiving a dependent parse tree for the program which is generated as required by the language-environment combination used to write and compile the source code;

translating the dependent parse tree into an independent parse tree which is independent of the language-environment combination; and analyzing the independent parse tree as required to obtain the information.

2. The method set forth in claim 1 wherein:

the step of translating the dependent parse tree includes the steps of:

receiving a combination specification which describes the language-environment combination at least to an extent relevant to the dependent parse tree;

employing the combination specification to generate a translator; and employing the translator to translate the dependent parse tree into the independent parse tree.

3. The method set forth in claim 2 wherein:

the step of employing the translator includes the step of including in the independent parse tree invocations of routines in the environment of the combination which retrieve information from the dependent parse tree.

4. The method set forth in claim 2 wherein:

the step of employing the combination specification to generate a translator need only be performed once for a given language-environment combination.

5. The method set forth in claim 1 wherein:

the step of analyzing the independent parse tree includes the steps of:

receiving a method specification which indicates a method by which the information about the specific aspect may be obtained from the independent parse tree;

using the method specification to generate an analyzer for the specific aspect; and analyzing the independent parse tree by applying the analyzer to the independent parse tree.

6. The method set forth in claim 5 wherein:

the method specification has the property that any method indicated thereby is such that the step of analyzing the independent parse tree can be completed in a length of time which is a polynomial function of the independent parse tree's size.

7. A discovery tool for discovering information useful to a programmer about the source code of a program, the source code being written and compiled in one of a plurality of language-environment combinations and the discovery tool being characterized by:

a translator for translating a first parse tree representing the source code into a second parse tree representing the source code, the first parse tree being generated as required by the language-environment combination used to write and compile the source code and the second parse tree being independent of the language-environment combination; and means for discovering the information about the source code by analyzing the second parse tree.

8. The discovery tool set forth in claim 7 further comprising:

a translator generator responsive to a combination specification of the language-environment combination for generating the translator as required by the language-environment combination.

9. The discovery tool set forth in claim 7 wherein:

the translator includes means for including in the second parse tree invocations of routines in the environment of the combination which retrieve information from the first parse tree.

10. The discovery tool set forth in claim 8 wherein:

the translator generator need generate the translator only once for the language-environment combination.

11. The discovery tool set forth in claim 7 wherein the means for discovering the information comprises:

an analyzer generator which receives a method specification indicating a method by which the information may be obtained from the second parse tree; and an analyzer generated by the analyzer generator from the method specification, the analyzer being applied to the second parse tree to obtain the information.

12. The discovery tool set forth in claim 11 wherein:

the specification has the property that any method indicated thereby can be completed in a length of time which is a polynomial function of the second parse tree's size.

13. A discovery tool for discovering information about the source code of a program, the discovery tool being of the type wherein the information is discovered by analyzing a parse tree representing the source code and wherein the discovery tool includes an analyzer generator which receives a specification indicating a method by which the information may be obtained from the parse tree, and an analyzer generated by the analyzer generator from the specification, the analyzer being applied to the parse tree to obtain the information, the discovery tool being characterized in that:

the specification has the property that any method indicated thereby can be completed in a length of time which is a polynomial function of the size of the parse tree.

\* \* \* \* \*